US010506623B2

United States Patent
Lee et al.

(10) Patent No.: US 10,506,623 B2
(45) Date of Patent: Dec. 10, 2019

(54) METHOD FOR TRIGGERING A BSR FOR SIDELINK DATA IN A D2D COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/743,639

(22) PCT Filed: Aug. 19, 2016

(86) PCT No.: PCT/KR2016/009170
§ 371 (c)(1),
(2) Date: Jan. 10, 2018

(87) PCT Pub. No.: WO2017/034232
PCT Pub. Date: Mar. 2, 2017

(65) Prior Publication Data
US 2018/0206257 A1 Jul. 19, 2018

Related U.S. Application Data

(60) Provisional application No. 62/208,477, filed on Aug. 21, 2015.

(51) Int. Cl.
*H04W 4/00* (2018.01)
*H04W 72/12* (2009.01)
(Continued)

(52) U.S. Cl.
CPC ......... *H04W 72/1263* (2013.01); *H04L 47/39* (2013.01); *H04W 28/02* (2013.01);
(Continued)

(58) Field of Classification Search
USPC ....... 370/229, 230, 235, 236, 252, 315, 328, 370/329, 492, 501
See application file for complete search history.

(56) References Cited

U.S. PATENT DOCUMENTS

2012/0250605 A1\* 10/2012 Du ........................ H04L 47/14
370/315
2013/0003650 A1\* 1/2013 Han ...................... H04B 7/155
370/315

(Continued)

FOREIGN PATENT DOCUMENTS

| WO | 2015016574 | 2/2015 |
| WO | 2015099321 | 7/2015 |
| WO | 2015115743 | 8/2015 |

OTHER PUBLICATIONS

PCT International Application No. PCT/KR2016/009170, Notification of Transmittal of the International Search Report and the Written Opinion of the International Searching Authority, or Declaration dated Nov. 21, 2016, 10 pages.

(Continued)

*Primary Examiner* — Kwang B Yao
*Assistant Examiner* — Nguyen H Ngo
(74) *Attorney, Agent, or Firm* — Lee Hong Degerman Kang Waimey

(57) ABSTRACT

The present invention relates to a wireless communication system. More specifically, the present invention relates to a method and a device for triggering a BSR for sidelink data in a D2D communication system, the method comprising: configuring a sidelink logical channel; receiving a sidelink data of the sidelink logical channel from upper layer; checking whether the sidelink data of the sidelink logical channel is received from the eNB or not; and triggering a buffer status reporting according to a result of the checking, wherein if the sidelink data of the sidelink logical channel is (Continued)

received from the eNB, the buffer status reporting is not triggered.

14 Claims, 12 Drawing Sheets

(51) Int. Cl.
| | |
|---|---|
| *H04W 28/02* | (2009.01) |
| *H04L 12/801* | (2013.01) |
| *H04W 76/14* | (2018.01) |
| *H04W 74/08* | (2009.01) |
| *H04W 40/22* | (2009.01) |
| *H04W 72/14* | (2009.01) |
| *H04W 84/18* | (2009.01) |
| *H04W 88/04* | (2009.01) |

(52) U.S. Cl.
CPC ....... *H04W 28/0278* (2013.01); *H04W 40/22* (2013.01); *H04W 72/1242* (2013.01); *H04W 72/1284* (2013.01); *H04W 72/1289* (2013.01); *H04W 72/14* (2013.01); *H04W 74/0866* (2013.01); *H04W 76/14* (2018.02); *H04W 72/1294* (2013.01); *H04W 84/18* (2013.01); *H04W 88/04* (2013.01)

(56) References Cited

U.S. PATENT DOCUMENTS

| | | | |
|---|---|---|---|
| 2014/0023008 A1* | 1/2014 | Ahn | H04L 5/006 370/329 |
| 2014/0066119 A1 | 3/2014 | Tavildar et al. | |
| 2015/0055567 A1 | 2/2015 | Narasimha et al. | |
| 2015/0296407 A1* | 10/2015 | Guo | H04W 72/1284 370/230 |
| 2016/0044678 A1* | 2/2016 | Kwon | H04W 76/14 370/329 |
| 2016/0044707 A1 | 2/2016 | Folke et al. | |
| 2016/0044737 A1* | 2/2016 | Kwon | H04W 76/14 370/328 |
| 2016/0128082 A1 | 5/2016 | Chen et al. | |
| 2016/0183241 A1* | 6/2016 | Lee | H04W 56/0015 455/425 |
| 2016/0270110 A1 | 9/2016 | Dinan | |
| 2016/0270114 A1 | 9/2016 | Dinan | |
| 2016/0302181 A1* | 10/2016 | Fujishiro | H04W 72/0406 |
| 2016/0365959 A1 | 12/2016 | Dinan | |
| 2016/0366675 A1 | 12/2016 | Dinan | |
| 2016/0366681 A1 | 12/2016 | Dinan | |
| 2017/0086168 A1* | 3/2017 | Takahashi | H04W 72/1284 |
| 2017/0303266 A1 | 10/2017 | Lu et al. | |
| 2017/0303307 A1 | 10/2017 | Xu et al. | |
| 2017/0325255 A1 | 11/2017 | Xu et al. | |
| 2018/0027429 A1* | 1/2018 | Li | H04W 40/22 455/426.1 |
| 2018/0035430 A1 | 2/2018 | Futaki | |
| 2018/0048498 A1 | 2/2018 | Stern-Berkowitz et al. | |
| 2018/0070264 A1 | 3/2018 | Saiwai et al. | |
| 2018/0116007 A1 | 4/2018 | Yasukawa et al. | |
| 2018/0139724 A1 | 5/2018 | Loehr et al. | |
| 2018/0146494 A1 | 5/2018 | Khoryaev et al. | |
| 2018/0167964 A1 | 6/2018 | Dinan | |
| 2018/0206176 A1* | 7/2018 | Panteleev | H04W 76/14 |
| 2018/0206260 A1* | 7/2018 | Khoryaev | H04W 72/1242 |
| 2018/0213438 A1 | 7/2018 | Muraoka et al. | |
| 2018/0234279 A1 | 8/2018 | Dinan | |
| 2018/0235027 A1 | 8/2018 | Adachi et al. | |
| 2018/0295646 A1 | 10/2018 | Faurie et al. | |
| 2018/0324838 A1 | 11/2018 | Folke et al. | |

OTHER PUBLICATIONS

PCT International Application No. PCT/KR2016/009169, Notification of Transmittal of the International Search Report and the Written Opinion of the International Searching Authority, or Declaration dated Nov. 28, 2016, 10 pages.

Huawei, "Report on [90#26][LTE/ProSe] Rel-13 SL BSR trigger and cancellation", 3GPP TSG RAN WG2 Meeting #91, R2-153231, Aug. 2015, 11 pages.

ITL, "Correction on Sidelink BSR transmission", 3GPP TSG RAN WG2 Meeting #91, R2-153325, Aug. 2015, 3 pages.

Nokia, "Events that trigger sidelink BSR", 3GPP TSG RAN WG2 Meeting #91, R2-153709, Aug. 2015, 4 pages.

Intel, "Corrections to Sidelink in MAC", 3GPP TSG RAN WG2 Meeting #91, R2-153272, Aug. 2015, 13 pages.

Samsung, "MAC PDU Addressing for Communication with UE-to-Network Relay", 3GPP TSG RAN WG2 Meeting #91, R2-153098, Aug. 2015, 3 pages.

U.S. Appl. No. 15/745,930, Office Action dated Dec. 31, 2018, 12 pages.

European Patent Office Application Serial No. 16839521.8, Search Report dated Jan. 30, 2019, 11 pages.

United States Patent and Trademark Office U.S. Appl. No. 15/745,930, Office Action dated Jul. 5, 2019, 11 pages.

* cited by examiner (a) Control-Plane Protocol Stack (b) User-Plane Protocol Stack

METHOD FOR TRIGGERING A BSR FOR SIDELINK DATA IN A D2D COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/009170, filed on Aug. 19, 2016, which claims the benefit of U.S. Provisional Application No. 62/208,477, filed on Aug. 21, 2015, the contents of which are all hereby incorporated by reference herein in their entirety.

TECHNICAL FIELD

The present invention relates to a wireless communication system and, more particularly, to a method for triggering a BSR for sidelink data in a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE

Technical Problem

An object of the present invention devised to solve the problem lies in a method and device for a method for triggering a BSR for sidelink data in a D2D communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

It is invented that a Relay UE doesn't trigger a BSR when the SL data is received form the eNB.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
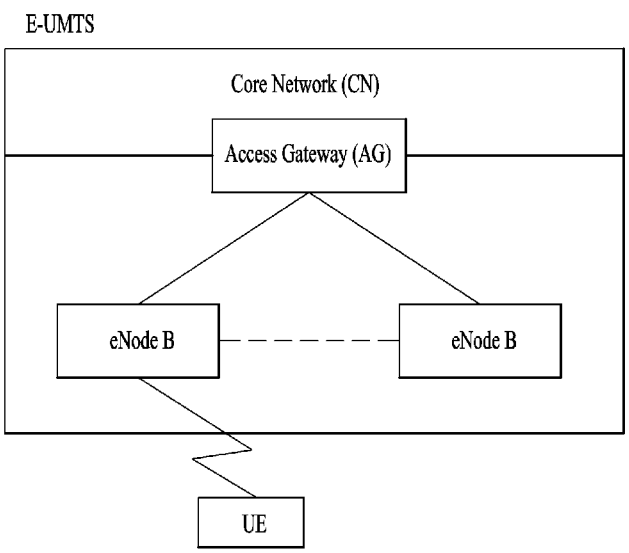
FIG. 1 is a diagram showing a network structure of an Evolved Universal Mobile Telecommunications System (E-UMTS) as an example of a wireless communication system.
Figure 2A:
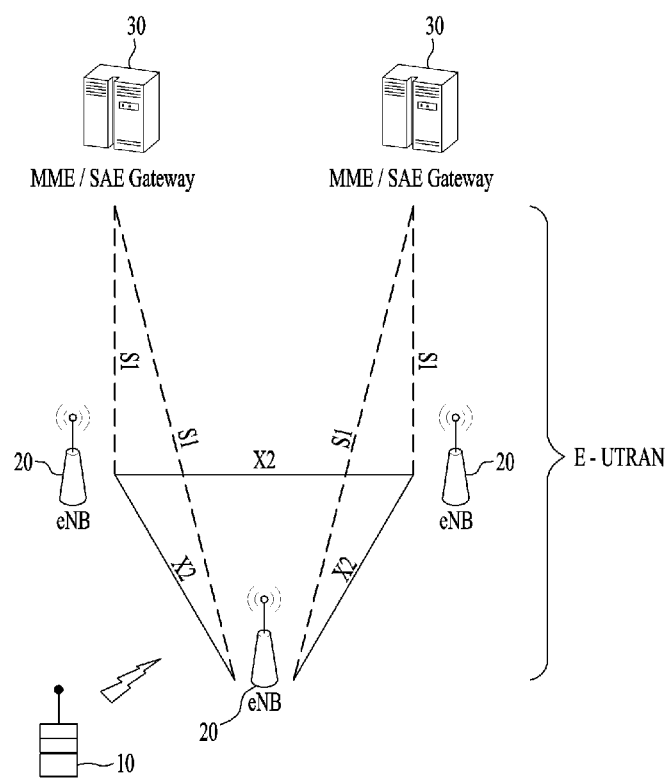
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
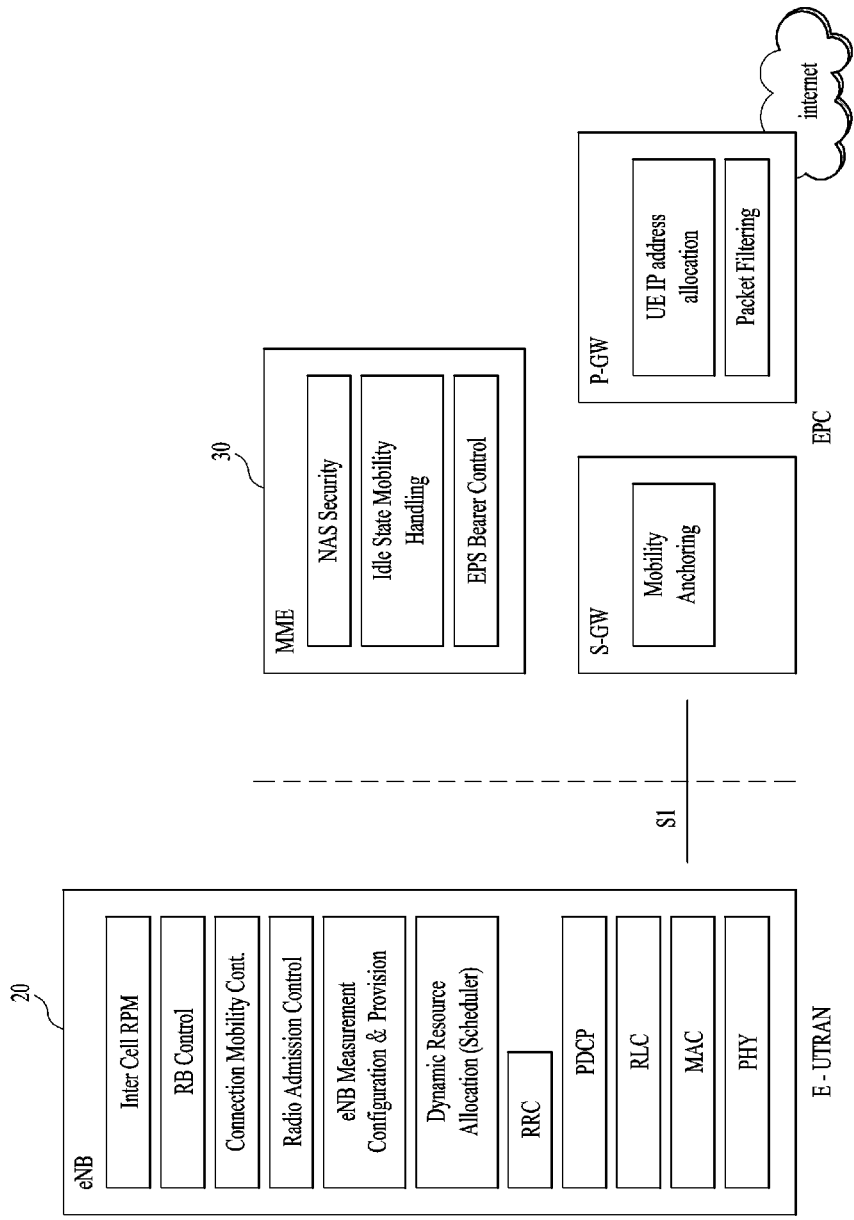
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
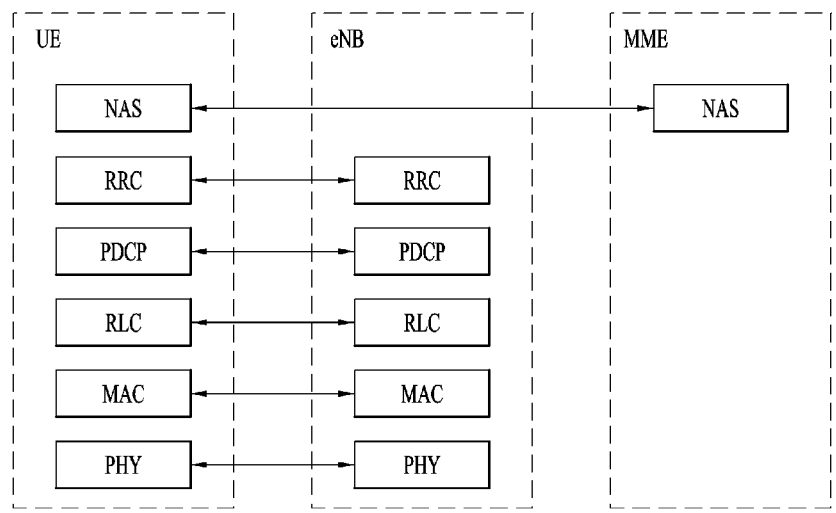
FIG. 3 is a diagram showing a control plane and a user plane of a radio interface protocol between a UE and an E-UTRAN based on a 3rd generation partnership project (3GPP) radio access network standard.
Figure 3:
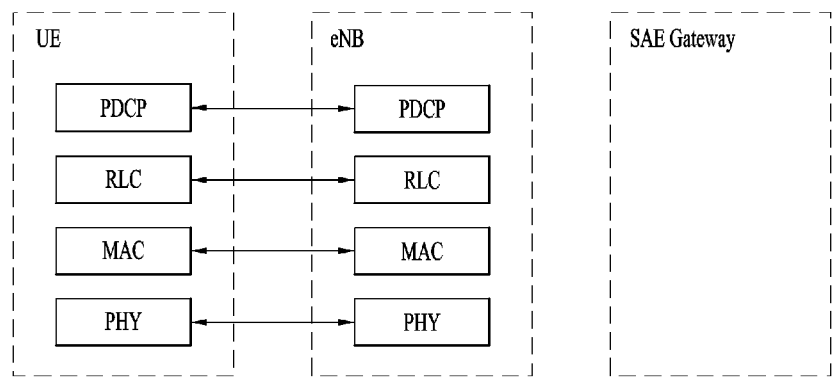

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
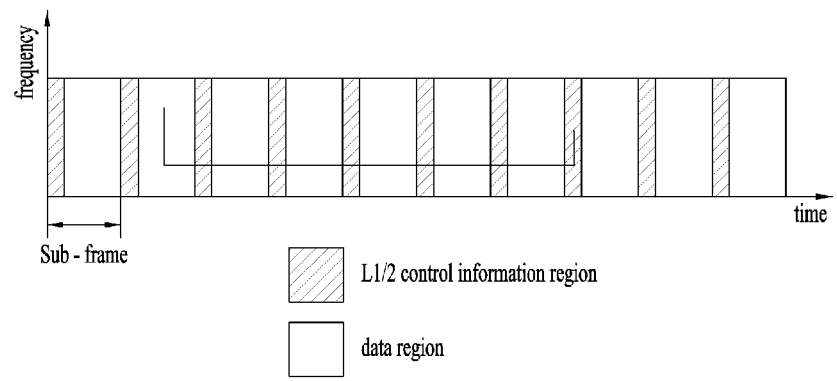
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
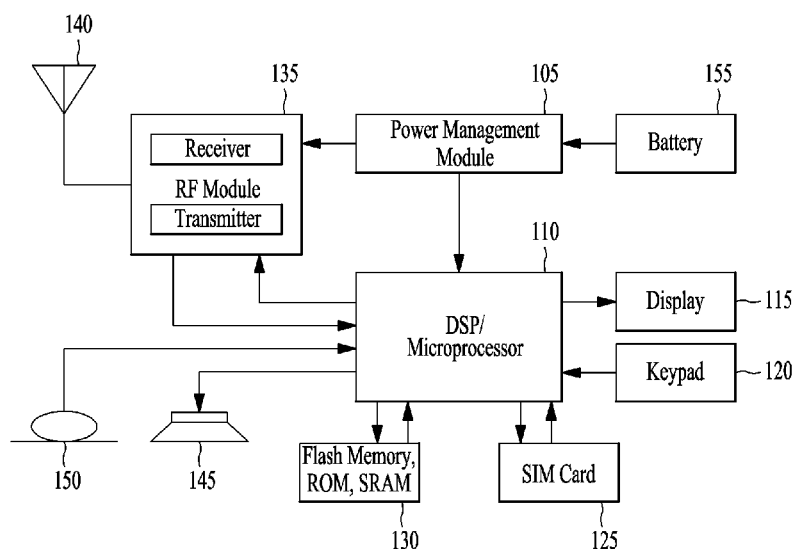
FIG. 5 is a block diagram of a communication apparatus according to an embodiment of the present invention

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

Figure 6:
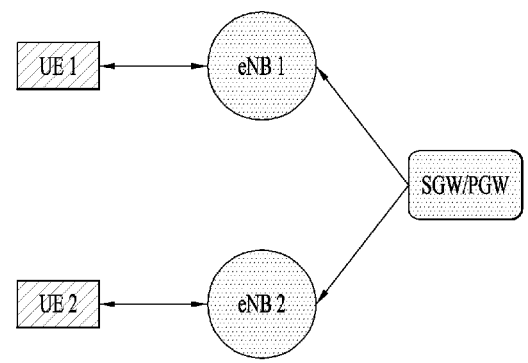
FIG. 6 is an example of default data path for a normal communication.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

Figure 7:
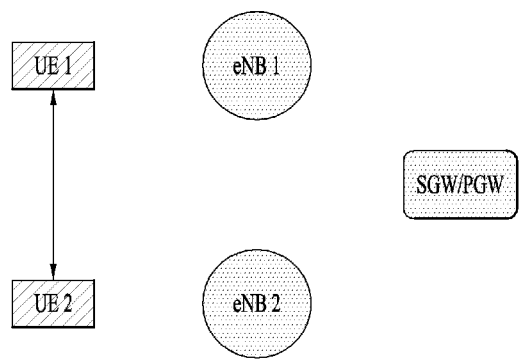
FIGS. 7 and 8 are examples of data path scenarios for a proximity communication.
Figure 8:
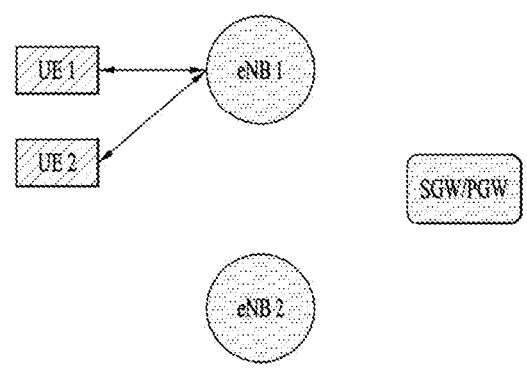

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

Figure 9:
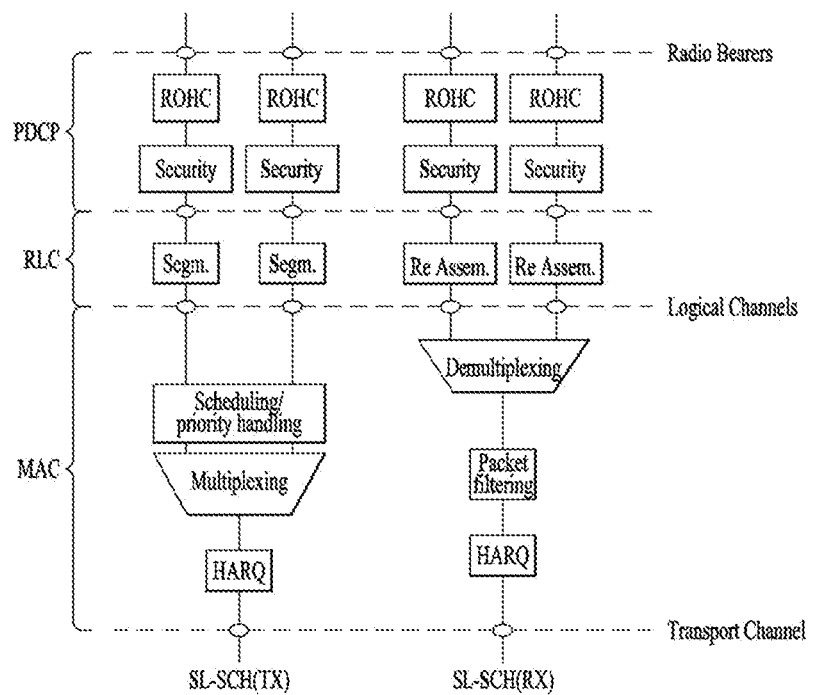
FIG. 9 is a conceptual diagram illustrating for a Layer 2 Structure for Sidelink.

FIG. 9 is a conceptual diagram illustrating for a Layer 2 structure for Sidelink.

Sidelink communication is a mode of communication whereby UEs can communicate with each other directly over the PC5 interface This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting SBCCH and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
 Uu transmission/reception (highest priority);
 PC5 sidelink communication transmission/reception;
 PC5 sidelink discovery announcement/monitoring (lowest priority).

Figure 10A:
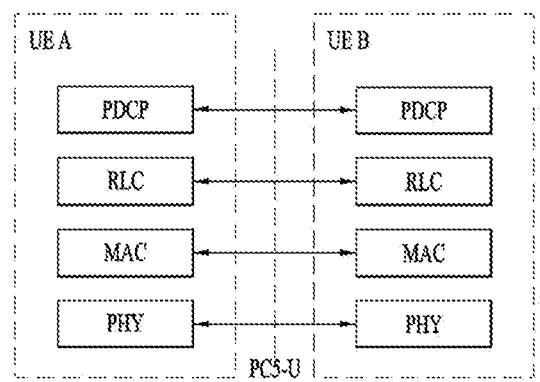
FIG. 10A is a conceptual diagram illustrating for User-Plane protocol stack for ProSe Direct Communication.
Figure 10B:
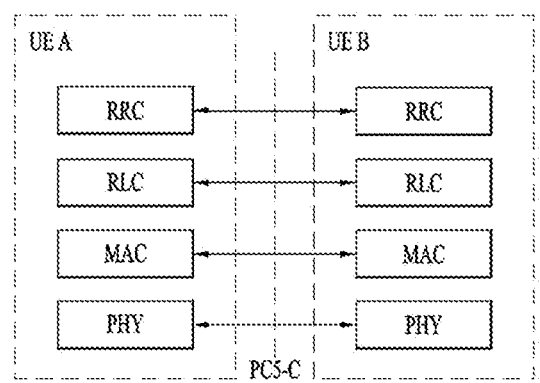
FIG. 10B is Control-Plane protocol stack for ProSe Direct Communication.

FIG. 10A is a conceptual diagram illustrating for User-Plane protocol stack for ProSe Direct Communication, and FIG. 10B is Control-Plane protocol stack for ProSe Direct Communication.

FIG. 10A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 10A.

User plane details of ProSe Direct Communication: i) there is no HARQ feedback for sidelink communication, ii) RLC UM is used for sidelink communication, iii) RLC UM is used for sidelink communication, iv) a receiving RLC UM entity used for sidelink communication does not need to be configured prior to reception of the first RLC UMD PDU, and v) ROHC Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the PPPP of protocol data unit transmitted over PC5 interface by higher layer. There is a PPPP associated with each logical channel.

SL-RNTI is an unique identification used for ProSe Direct Communication Scheduling.

The Source Layer-2 ID identifies the sender of the data in sidelink communication. The Source Layer-2 ID is 24 bits long and is used together with Destination Layer-2 ID and LCID for identification of the RLC UM entity and PDCP entity in the receiver.

The destination Layer-2 ID identifies the target of the data in sidelink communication. The Destination Layer-2 ID is 24 bits long and is split in the MAC layer into two bit strings: i) One bit string is the LSB part (8 bits) of Destination Layer-2 ID and forwarded to physical layer as Group Destination ID. This identifies the target of the intended data in sidelink control information and is used for filtering of packets at the physical layer. And ii) Second bit string is the MSB part (16 bits) of the Destination Layer-2 ID and is carried within the MAC header. This is used for filtering of packets at the MAC layer.

No Access Stratum signalling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, higher layer provides Source Layer-2 ID and Destination Layer-2 ID.

FIG. 10B shows the protocol stack for the control plane.

A UE does not establish and maintain a logical connection to receiving UEs prior to one-to-many a sidelink communication. Higher layer establish and maintain a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 10B.

The PPPP is a ProSe Per-Packet Priority. The ProSe Per-Packet Priority is summarized as follows:

i) a single UE shall be able to transmit packets of different priorities on PC5, ii) the UE upper layers provide to the access stratum a ProSe Per Packet Priority from a range of possible values, iii) the ProSe Per Packet Priority is used to support preferential transmission of packets both intra-UE and across different UEs, iv) the support of 8 priority levels for the ProSe Per Packet Priority should be sufficient, v) the ProSe Per Packet Priority applies to all PC5 traffic, and vi) the ProSe Per Packet Priority is independent of the layer-2 destination of the transmission.

From the above summary, it seems that SA2 think ProSe packet prioritization based on PPPP is very important and should be supported in PC5 interface in any case. Keeping this observation in mind, we explain how the LCP procedures should be changed from Rel-12.

Figure 11:
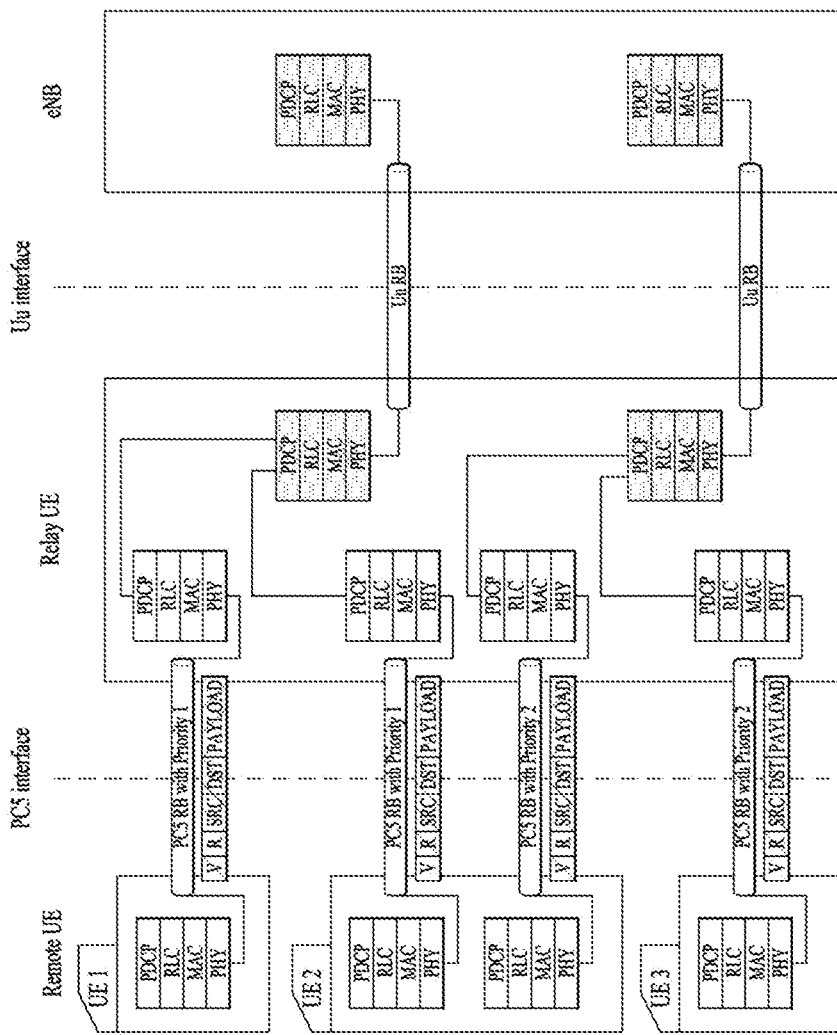
FIG. 11 is an example for PC5 interface between remote UEs and a relay UE.

FIG. 11 is an example for PC5 interface between remote UEs and a relay UE.

In ProSe, a UE communicates with other UEs directly over PC5 interface.

By introducing a Relay UE for UE-to-NW relay, a remote UE transmits data to an eNB via the Relay UE, and the eNB transmits data to the remote UE via the Relay UE. I.e., the Relay UE relays data to/from eNB.

As data transfer between the remote UE and the Relay UE is ProSe communication, the Relay UE is communicating with the remote UE over PC5 interface. In the meantime, as data transfer between the Relay UE and the eNB is a normal uplink/downlink (Uu) communication, the Relay UE is communicating with the eNB over Uu interface. This implies that if data has higher priority in PC5 communication, it should also be higher prioritized in Uu communication.

Over PC5 interface, Per-Packet Priority (PPP), is used to prioritize a certain packet, where the priority is independent with ProSe destination or ProSe UE. In order to prioritize the packet with higher priority over Uu interface as well, the Relay UE needs to know the priority of the packet so that the Relay UE provides more opportunities of transmission to the packet with higher priority.

In order to transmit on the SL-SCH, the MAC entity must have a sidelink grant. The sidelink grant is selected as follows: if the MAC entity is configured to receive a sidelink grant dynamically on the PDCCH and more data is available in STCH than can be transmitted in the current SC period, the MAC entity shall determine a set of subframes in which transmission of SCI and transmission of first transport block occur using the received sidelink grant, consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available, and clear the configured sidelink grant at the end of the corresponding SC Period.

If the MAC entity has a configured sidelink grant occurring in this subframe, and if the configured sidelink grant corresponds to transmission of SCI, the MAC entity shall, for each subframe, instruct the physical layer to transmit SCI corresponding to the configured sidelink grant.

If the MAC entity has a configured sidelink grant occurring in this subframe, and if the configured sidelink grant corresponds to transmission of first transport block, the MAC entity shall deliver the configured sidelink grant and the associated HARQ information to the Sidelink HARQ Entity for this subframe.

For PDU(s) associated with one SCI, MAC shall consider only logical channels with same Source Layer-2 ID-Destination Layer-2 ID pairs.

In ProSe communication, the UE must have a SL grant for SL data transmission. In Rel-12, the SL grant has following characteristics: within one SC period, SL data of only one ProSe Group can be transmitted, and for one ProSe Group (r destination), only one SL grant is used.

In summary, within one SC period, a ProSe UE transmits SL data of only one ProSe destination by using only one SL grant.

If the UE receives multiple SL grants for an SC period, the UE overwrites the previous ones, if any, and uses the only the last received SL grant.

When the UE receives an SL grant, as there is no indication in SL grant with which group the SL grant is associated, the UE by itself selects one ProSe destination and generates a MAC PDU by including only the SL data of the selected ProSe destination.

In Rel-13, ProSe Relay is introduced in LTE. For ProSe Relay, an eNB forwards SL data of Remote UE to a Relay UE, and the Relay UE forwards SL data to the Remote UE. As the Relay UE is likely to serve as a relay for multiple Remote UEs, the Relay UE will receive SL data of multiple Remote UEs from the eNB. Accordingly, the Relay UE is different from a Rel-12 ProSe UE in that the Relay UE may need to transmit SL data to multiple Remote UEs within one SC period.

For this, 1) the eNB needs to provide multiple SL grants to the Relay UE wherein each SL grant should be associated with one specific ProSe destination (one Remote UE), and 2) the UE can transmit SL data of multiple ProSe destinations within one SC period.

Figure 12:
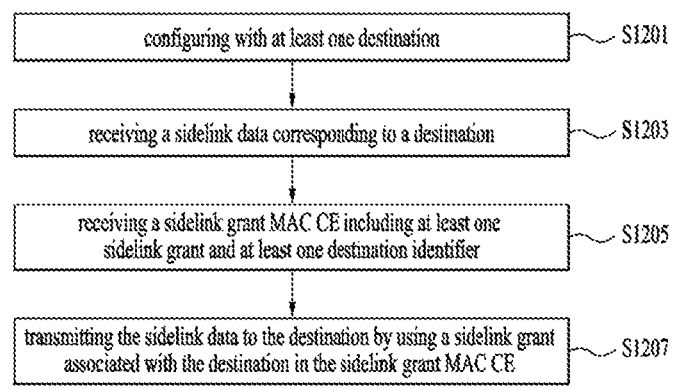
FIG. 12 is a diagram for transmitting a sidelink data in a D2D communication system according to embodiments of the present invention.

FIG. 12 is a diagram for transmitting a sidelink data in a D2D communication system according to embodiments of the present invention.

It is invented that a Relay UE receives at least one SL grant via MAC signal from an eNB, wherein each SL grant is to be used for SL data transmission of one ProSe destination.

The ProSe Group refers a ProSe Destination indicating a destination(s) for relay or non-relay related one-to-one or one-to-many sidelink communication. For one-to-one communication, the destination is identified by the Layer-2 ID for unicast communication, while for one-to-many communication, the destination is identified by the ProSe Layer-2 Group ID.

An eNB is transmitting SL data to a Remote UE via a Relay UE, wherein the Relay UE is to serve at least one Remote UE.

The SL data comprises two types of data. If the SL data is data to be relayed from the eNB to the Remote UE via the Relay UE, the SL data refers a relay data, or if the SL data is data generated by the UE, the SL data refers a ProSe data. In this invention, the SL data refers the relay data.

The Relay UE is configured with at least one ProSe destination (S1201).

Preferably, the Relay UE and the Remote UE belong to one ProSe destination, wherein the Relay UE belongs to at least one ProSe destination.

If the eNB has SL data available for transmission for a ProSe destination to which the Remote UE belongs, the eNB transmits the SL data corresponding to a ProSe destination of the at least one ProSe destination to a UE (S1203).

The eNB generates a SL grant MAC CE including the SL grant for the ProSe destination and/or the ProSe destination identifier of the ProSe destination with which the SL grant is associated, and transmits the SL grant MAC CE to the Relay UE (S1205).

Preferably, the SL grant MAC CE is identified by a LCID of the corresponding MAC subheader, and the SL grant MAC CE is a variable size of MAC control element.

Preferably, the ProSe destination identifier can be a Remote UE identifier if one-to-one communication.

Preferably, the eNB can transmit the generated SL grant MAC CE and the SL data for the ProSe destination of which the SL grant is contained in the generated SL grant MAC CE in a same MAC PDU.

When a Relay UE receives a MAC PDU from the eNB, if the received MAC PDU contains SL data, the Relay UE stores the SL data for at least one ProSe Group contained in the received MAC PDU. If the received MAC PDU contains the SL grant MAC CE, the Relay UE stores the SL grants contained in the received MAC PDU. The Relay UE considers that each SL grant is for the ProSe Group as indicated by the corresponding ProSe Group identifier.

Through the steps of S1203 to S1205, if the Relay UE has a SL data for a ProSe destination, and the Relay UE has the SL grant associated with that ProSe destination, the Relay UE transmits the SL data to the ProSe destination by using a SL grant associated with the ProSe destination in the SL grant MAC CE (S1207). And the Relay UE may not trigger SL BSR.

If the Relay UE does not have the SL grant associated with that ProSe destination, the Relay UE triggers SL BSR. The Relay UE can trigger SL BSR if the SL grant for that ProSe destination is not received from the eNB for a certain time period after the Relay UE receives SL data for that ProSe Group from the eNB.

Figure 13:
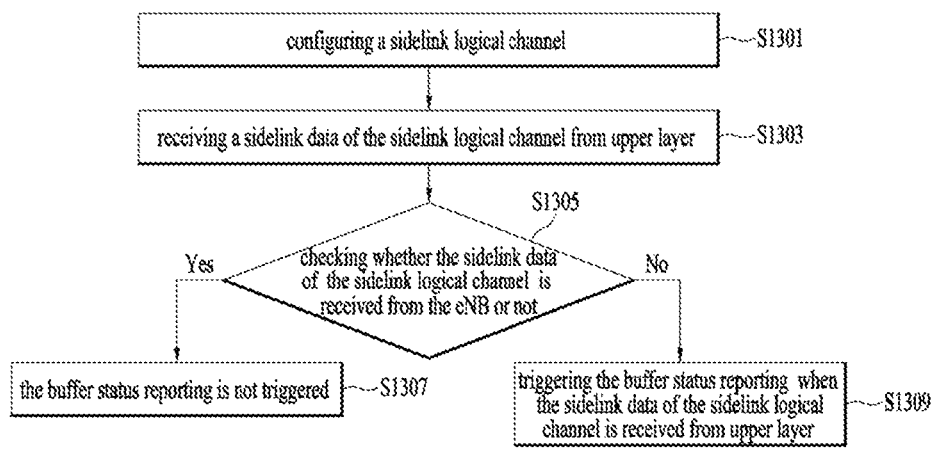
FIG. 13 is a diagram for triggering a BSR for sidelink data in a D2D communication system according to embodiments of the present invention.

FIG. 13 is a diagram for triggering a BSR for sidelink data in a D2D communication system according to embodiments of the present invention.

A UE configures a sidelink logical channel for a D2D communication (1301).

When the UE has SL data of the configured sidelink logical channel (S1303), the UE checks whether the sidelink data of the sidelink logical channel is received from the eNB or not (S1305).

Preferably, when the sidelink data of the sidelink logical channel becomes available for transmission in a PDCP entity, the UE has the SL data of the sidelink logical channel.

The SL data comprises two types of data. If the SL data is data to be relayed from the eNB to the Remote UE via the Relay UE, the SL data refers a relay data, or if the SL data is data generated by the UE, the SL data refers a ProSe data. In this invention, the SL data refers the relay data.

So, when the UE has the SL data of the configured sidelink logical channel, the UE can receive the SL data from the eNB, or generate the SL data by itself.

If the sidelink data of the sidelink logical channel is received from the eNB, the UE doesn't trigger a buffer status reporting (S1307). And the UE doesn't transmit the sidelink data of the sidelink logical channel until a sidelink grant is received from the eNB.

In this case, the UE triggers the buffer status reporting when a certain time period is passed after the sidelink data of the sidelink logical channel is received from the eNB.

Preferably, a sidelink grant for the transmitting the sidelink data is not received from the eNB during the certain time period.

If the sidelink data of the sidelink logical channel is not received from the eNB, the UE triggers the buffer status reporting when the sidelink data of the sidelink logical channel is received from upper layer (1309).

Preferably, the sidelink data of the sidelink logical channel not received from the eNB is a sidelink data generated by the UE.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for a user equipment (UE) operating in a wireless communication system, the method comprising:
    configuring a sidelink logical channel;
    receiving a sidelink data of the sidelink logical channel from upper layer;
    checking whether the sidelink data of the sidelink logical channel is received from an eNB or not; and
    triggering a buffer status reporting according to a result of the checking,
    wherein if the sidelink data of the sidelink logical channel is received from the eNB, the buffer status reporting is not triggered, and
    wherein the UE triggers the buffer status reporting when a certain time period is passed after the sidelink data of the sidelink logical channel is received from the eNB.

2. The method according to claim 1, wherein the UE does not transmit the sidelink data of the sidelink logical channel until a sidelink grant is received from the eNB.

3. The method according to claim 1, wherein a sidelink grant for transmitting the sidelink data is not received from the eNB during the certain time period.

4. The method according to claim 1, wherein the sidelink data received from the eNB is a data to be relayed from the eNB to another UE via the UE.

5. The method according to claim 1, wherein if the sidelink data of the sidelink logical channel is not received from the eNB, the UE triggers the buffer status reporting when the sidelink data of the sidelink logical channel is received from upper layer.

6. The method according to claim 5, wherein the sidelink data of the sidelink logical channel not received from the eNB is a sidelink data generated by the UE.

7. The method according to claim 1, wherein when the sidelink data of the sidelink logical channel becomes available for transmission in a Packet Data Convergence Protocol (PDCP) entity, the UE checks whether the sidelink data of the sidelink logical channel is received from the eNB or not.

8. A user equipment (UE) operating in a wireless communication system, the UE comprising:
    a Radio Frequency (RF) module including a transceiver; and
    a processor operably coupled with the RF module and configured to:
    configure a sidelink logical channel;
    receive a sidelink data of the sidelink logical channel from upper layer;
    check whether the sidelink data of the sidelink logical channel is received from an eNB or not; and
    trigger a buffer status reporting according to a result of the checking,
    wherein if the sidelink data of the sidelink logical channel is received from the eNB, the buffer status reporting is not triggered, and
    wherein the processor triggers the buffer status reporting when a certain time period is passed after the sidelink data of the sidelink logical channel is received from the eNB.

9. The UE according to claim 8, wherein the processor does not transmit the sidelink data of the sidelink logical channel until a sidelink grant is received from the eNB.

10. The UE according to claim 8, wherein a sidelink grant for transmitting the sidelink data is not received from the eNB during the certain time period.

11. The UE according to claim 8, wherein the sidelink data received from the eNB is a data to be relayed from the eNB to another UE via the UE.

12. The UE according to claim 8, wherein if the sidelink data of the sidelink logical channel is not received from the eNB, the processor triggers the buffer status reporting when the sidelink data of the sidelink logical channel is received from upper layer.

13. The UE according to claim 12, wherein the sidelink data of the sidelink logical channel not received from the eNB is a sidelink data generated by the UE.

14. The UE according to claim 8, wherein when the sidelink data of the sidelink logical channel becomes available for transmission in a Packet Data Convergence Protocol (PDCP) entity, the processor checks whether the sidelink data of the sidelink logical channel is received from the eNB or not.

\* \* \* \* \*